United States Patent [19]
Goretzki et al.

[11] 3,849,714

[45] Nov. 19, 1974

[54] STEPPER MOTOR CONTROL SYSTEM

[75] Inventors: Jerome A. Goretzki; Kenneth E. Hendrickson, both of Rochester; Gary L. Mattson; Larry F. Mattson, both of Pine Island, all of Minn.

[73] Assignee: International Business Machines Corporation, Armonk, N.Y.

[22] Filed: June 6, 1972

[21] Appl. No.: 260,238

[52] U.S. Cl. .............................. 318/685, 318/696
[51] Int. Cl. .......................................... G05b 19/40
[58] Field of Search ........ 318/138, 696, 685, 138 A

[56] References Cited
UNITED STATES PATENTS

| | | | |
|---|---|---|---|
| 3,345,547 | 10/1967 | Dunne | 318/696 |
| 3,374,410 | 3/1968 | Cronquist et al. | 318/696 |
| 3,385,984 | 5/1968 | O'Regan | 318/696 |
| 3,423,658 | 1/1969 | Barrus | 318/696 |
| 3,586,953 | 6/1971 | Markkanen | 318/696 |
| 3,588,661 | 6/1971 | Newell | 318/696 |
| 3,767,993 | 10/1973 | Yublonski | 378/696 |

*Primary Examiner*—G. R. Simmons
*Attorney, Agent, or Firm*—Keith T. Bleuer

[57] ABSTRACT

Control apparatus for a stepper motor functional to provide a varying amount of retro-torque braking depending on the load and voltage applied to the motor. The control apparatus includes circuitry responsive to the velocity of the rotor of the motor and more particularly to the time required for the rotor to move through a certain rotation and means for varying the application of the braking effect according to variations of this time and also of voltage applied to the motor.

13 Claims, 5 Drawing Figures

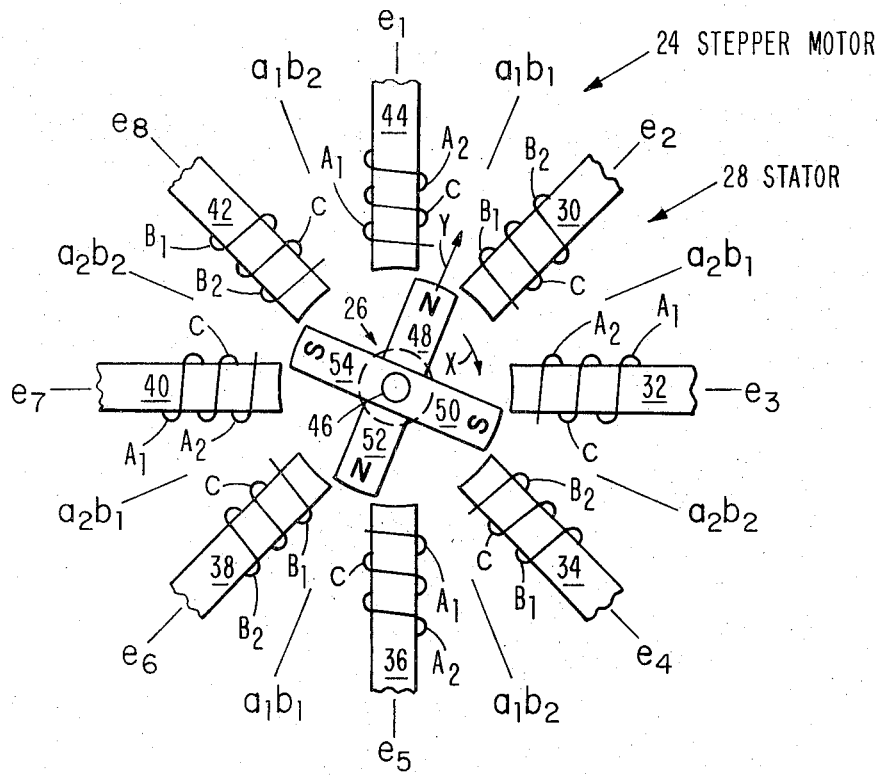
FIG. I
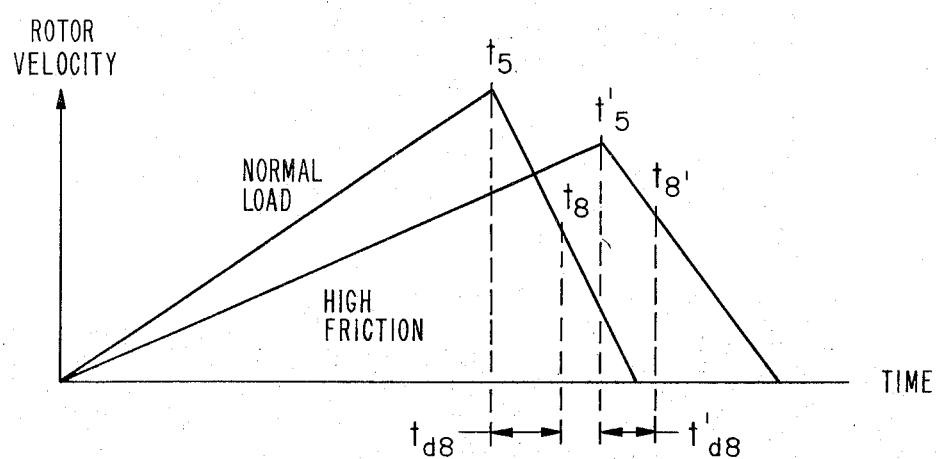
FIG. V

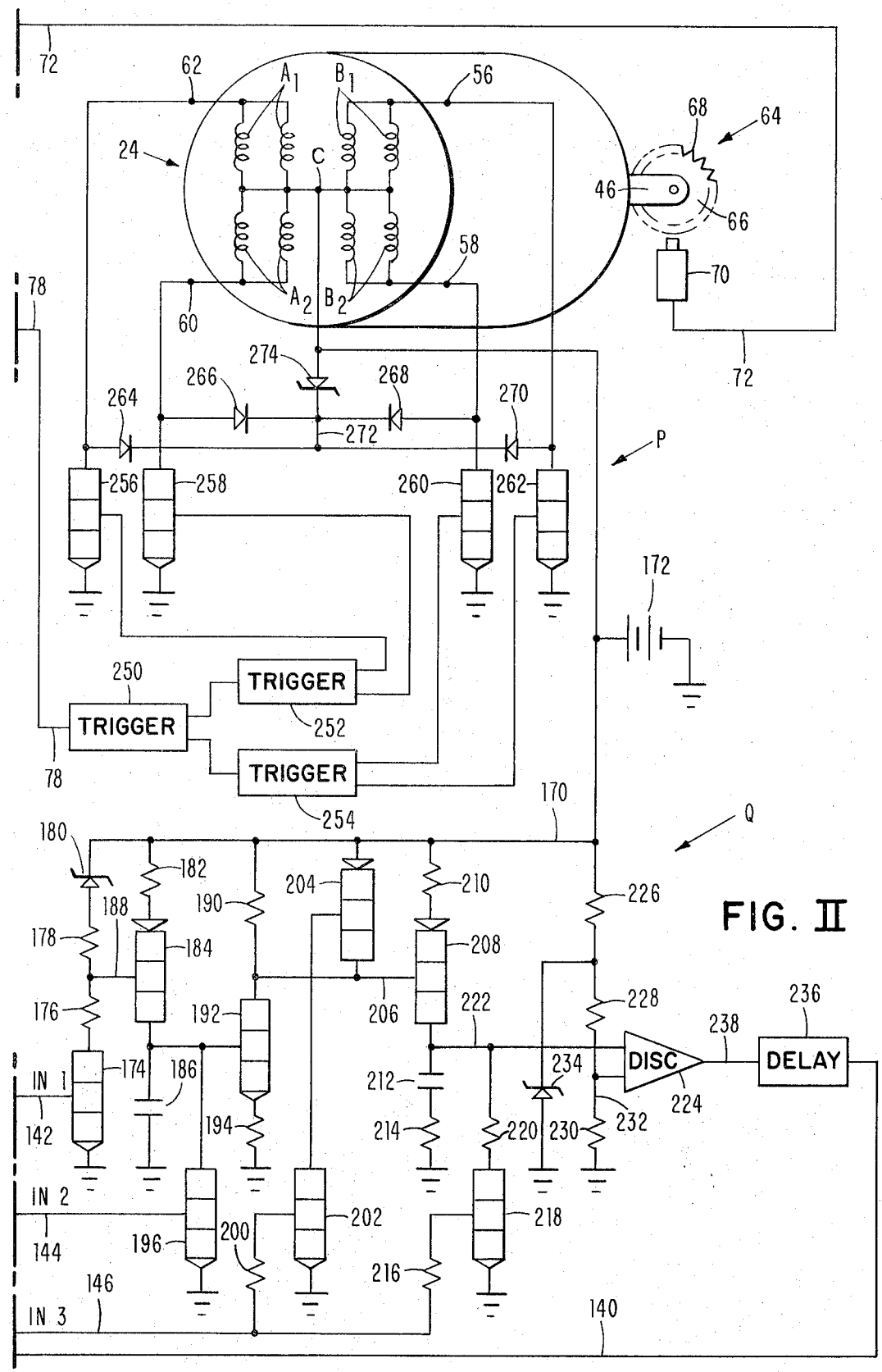
FIG. II

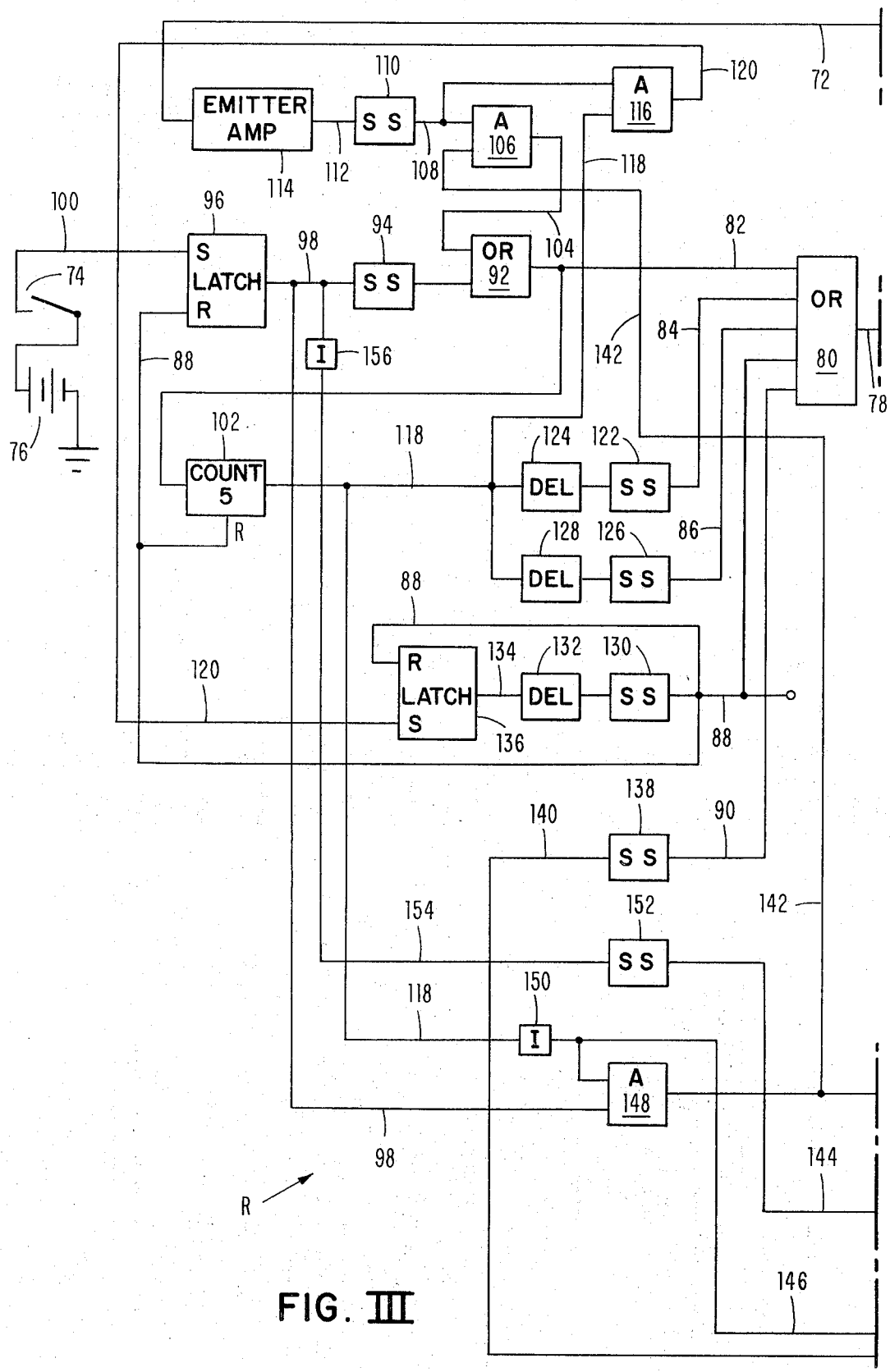
FIG. III

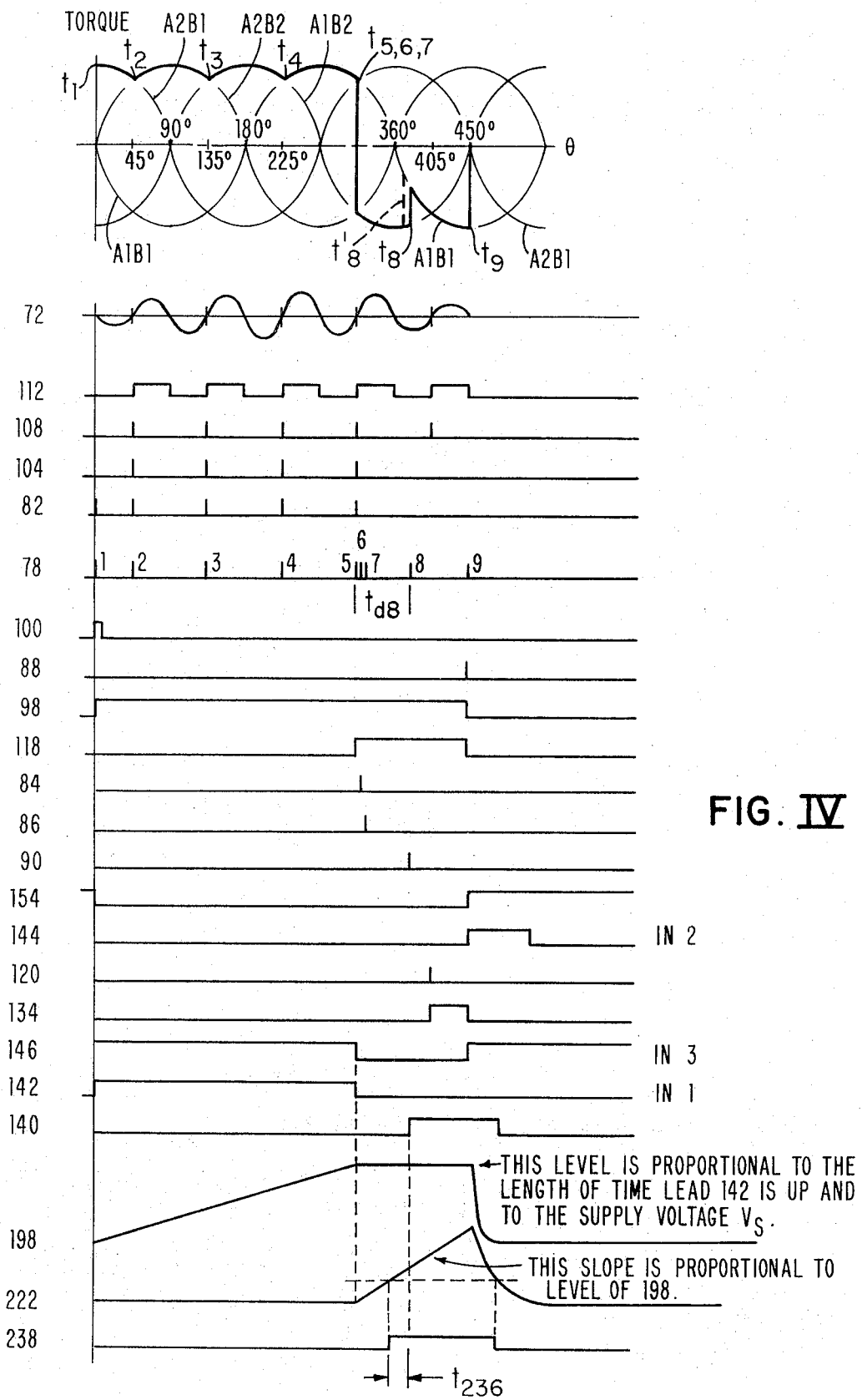
FIG. IV

STEPPER MOTOR CONTROL SYSTEM

BACKGROUND OF THE INVENTION

The invention relates to stepper motors and more particularly to electrical circuitry for controlling such motors.

Stepper motors have in the past been controlled such that the rotors of the motors are given an acceleration in the forward direction and then the rotors are given a deceleration so as to cause the rotors to move expeditiously from an initial position to a final position.

It has been found that the load on such a motor causes a variation in the functioning of the controls so that the controls function differently with a large load as compared to a small load and the same expeditious arrival at the final rotor position does not occur without oscillation at the final position. In addition, it has been found that a variation in voltage applied to the motor causes substantially the same results.

SUMMARY OF THE INVENTION

It is an object of the invention to provide improved controls for such a stepper motor which take account of the variations in load and the variations in applied voltage on the motor so that substantially the same expeditious arrival at the final rotor position is attained regardless of such variations.

In a preferred form, the controls of the invention includes circuitry for energizing the stator poles of a stepper motor so that the rotor is first accelerated and then, when a braking position of the rotor is reached, the energization of the stator poles is reversed through 180 electrical degrees so that the rotor is braked until the final rotor position is reached. The controls also includes circuitry for varying the time at which a change in stator pole energization is made during the decelerating phase, this time being variable depending upon the time required for the rotor to pass through a certain rotation during the accelerating phase of the rotor, with voltage variable means also being included so as to change the timing during deceleration upon variations of the voltage applied to the motor. Preferably, the timing effect of a charging condenser is utilized in order to determine the time required for the rotor to pass through a predetermined angle upon acceleration, and the charge on the condenser is effective so as to accordingly change the timing at which a change in magnetization is made of the stator poles during the decelerating phase.

BRIEF DESCRIPTION OF THE DRAWINGS

FIG. I is a diagramatic illustration of a stepper motor with which the circuitry of the invention may be used;

FIGS. II and III, when placed together with FIG. II on the right and FIG. III on the left, together illustrate the circuitry of the invention;

FIG. IV is a diagramatic illustration of various signal levels in the circuitry; and FIG. V is a graph showing the relationship between the velocity of the rotor of the stepper motor with respect to time, under a normal load and a high friction load.

DESCRIPTION OF THE PREFERRED EMBODIMENT

Referring now to the drawings and in particular to FIG. I, the stepper motor 24 with which the controls of the invention may be used, may be seen to comprise a rotor 26 and a stator 28. The stator 28 is provided with poles 30, 32, 34, 36, 38, 40, 42 and 44, and these poles are equally spaced about the driven shaft 46 of the stepper motor on which the rotor 26 is fixed. The rotor 26 has four poles 48, 50, 52 and 54. These poles are permanently magnetized so that the poles 48 and 52 are north poles, while the poles 50 and 54 are south poles. Windings $A_1$, $A_2$, $B_1$, and $B_2$ are disposed on the poles 30, 32, 34, 36, 38, 40, 42 and 44. Each of these poles has a winding pair $A_1$ and $A_2$ or a winding pair $B_1$ and $B_2$ disposed thereon. The two windings of each of these pairs have a center tap $c$ at the point of connection of the two windings, and the center taps $c$ of all of these winding pairs are connected together as is shown in FIG. II which also includes a schematic showing of the stepper motor 24. The poles 44 and 36 both have the windings $A_1$ and $A_2$ disposed thereon, with the windings $A_1$ being closer to the center; the poles 30 and 38 both have the windings $B_1$ and $B_2$ disposed thereon, with the windings $B_1$ being closer to the center; the poles 32 and 40 both have the windings $A_1$ and $A_2$ disposed thereon, with the windings $A_2$ being closer to the center; and the poles 34 and 42 both have the windings $B_1$ and $B_2$ disposed thereon, with the windings $B_2$ being closer to the center. As is shown in FIG. II, all of the windings $B_1$ shown in FIG. I are connected in parallel, and this is true respectively of the windings $B_2$, the windings $A_1$ and the windings $A_2$. As is shown in FIG. II, the windings $B_1$ are connected between the center tap $c$ and a terminal 56. Likewise, the windings $B_2$ are connected between the center tap $c$ and a terminal 58; the windings $A_2$ are connected between the center tap $c$ and the terminal 60; and the windings $A_1$ are connected between the center tap $c$ and the terminal 62.

The rotation of the rotor 26 are the output shaft 46 of the stepper motor 24 is under the control of an emitter 64 (See FIG. II). The emitter 64 comprises an emitter wheel 66, which is fixed on shaft 46 and is provided with peripheral teeth 68, and also comprises a magnetic transducer 70 which provides a changed voltage level on an output lead 72 corresponding to each of the teeth 68.

Parts P and Q of the circuitry for controlling the motor 24 are shown in FIG. II, and the remainder of the circuitry (circuitry portion R) is shown in FIG. III. The FIG. III part of the circuitry is the basic controlling part, and the lead 72 is connected to the FIG. III circuitry portion. The circuitry is also under the control of a switch 74 connected with a source of direct current, such as the battery 76. The FIG. III portion of the circuitry has an output lead 78 constituting the output of an OR circuit 80, and the lead 78 supplies a controlling signal to the portion P of the circuitry directly attached to the motor 24.

The OR circuit 80 has five inputs in the form of leads 82, 84, 86, 88 and 90. The lead 82 is supplied with a signal from an OR circuit 92 which is driven from a single shot 94. A latch 96 has an output lead 98 that is connected with the single shot 94, and the latch 96 has its set side connected to the switch 74 by means of a lead 100. The reset side of the latch 96 has the lead 98 applied to it. The lead 82 is also connected to Count 5 circuitry 102.

The OR circuit 92 also has an input in the form of lead 104 which constitutes the output of an AND circuit 106. The AND circuit 106 has an input in the form of a lead 108 constituting the output of a single shot 110. The single shot 110 has the input 112, and this constitutes the output of an emitter amplifier 114 which has, as its input, the lead 72 from the emitter 64. An AND circuit 116 has the lead 108 as an input and in addition has, as a second input, the lead 118 which constitutes the output of the Count 5 circuitry 102. The lead 102 constitutes the output of the AND circuit 116.

The second input lead 84 for the OR circuit 80 constitutes the output of a single shot 122 which in turn is driven by a delay circuit 124 connected to the lead 118. The third input 86 for the OR circuit 80 constitutes the output of a single shot 126 which is driven from a delay circuit 128 connected with the lead 118.

The fourth input lead 88 for the OR circuit 80 constitutes the output of a single shot 130 which is driven from a delay circuit 132. The lead 134 constitutes the input to the circuit 132 and also constitutes the output of a latch 136. The lead 120 is connected to the set side of the latch 136; and the lead 88 is connected to the reset sides of latch 136, Count 5 circuit 102 and latch 96.

The fifth input lead 90 for OR circuit 80 constitutes the output of a single shot 138, and the input to the single shot 138 is the lead 140 which constitutes the output of the circuit portion Q. This portion of the circuitry may be termed a "smart stop circuitry" portion, and its inputs are the In1, In2 and In3 leads 142, 144 and 146 all derived from the circuitry portion R.

The lead 142 constitutes the output of an AND circuit 148 having lead 98 as one input, and lead 142 is also one of the two inputs of the AND circuit 106. The lead 146 constitutes the output of an inverter circuit 150 having the lead 118 as an input, and lead 146 also constitutes the other input of the AND circuit 148. The lead 144 constitutes the output of a single shot 152. The input of the single shot 152 is a lead 154 which constitutes the output of an inverter circuit 156 having the lead 98 as an input.

The "smart stop circuitry" portion Q shown in FIG. II has a lead 170 connected to a source of DC voltage such as a battery 172. A transistor 174 has the input lead 142 applied to it, and two resistors 176 and 178 and a zener diode 180 are connected in series between the transistor 174 and the lead 170. A resistor 182, a transistor 184 and a condenser 186 are connected in series between ground and the lead 170, and a lead 188 connects the junction between the resistors 176 and 178 with the transistor 184. A resistor 190, a transistor 192 and a resistor 194 are connected in series between the lead 170 and ground, and a transistor 196 has its output lead 198 connected to both the transistor 192 and to the junction between the transistor 184 and the condenser 186. The transistor 196 is controlled from the input lead 144.

The input lead 146 is connected through a resistor 200 with the transistor 202, and the transistor 202 is connected to a transistor 204 that is in turn connected between the lead 170 and a lead 206. The lead 206 is connected to the junction between the transistor 192 and the resistor 190 and is connected to control a transistor 208. The transistor 208 is connected in series with a resistor 210, a condenser 212 and another resistor 214 between the lead 170 and ground, as shown. The input lead 146 is connected through a resistor 216 with a transistor 218. The transistor 218 is connected in series with a resistor 220 between a lead 222 and ground. The lead 222 is connected to the junction between the condenser 212 and the transistor 208 and is also connected to a discriminator circuit 224.

Resistors 226, 228 and 230 are connected in series between the lead 170 and ground, and lead 232 connects the junction of the resistors 228 and 230 with the discriminator circuit 224. A zener diode 234 connects the junction between the resistors 226 and 228 with ground. A time delay circuit 236 connects the output of the discriminator circuit 224 with the output lead 140.

The circuitry portion P shown in FIG. II constitutes that circuitry portion directly controlling the motor 24 and comprises a trigger 250 having the lead 78 as an input. The trigger 250 is connected to control two other triggers 252 and 254. The trigger 252 is connected to control two transistors 256 and 258, and the transistors 256 and 258 are respectively connected to the terminals 62 and 60. The trigger 254 has its output connected with transistors 260 and 262, and these transistors are respectively connected with the terminals 58 and 56.

Diodes 264, 266, 268 and 270 respectively connect the terminals 62, 60, 58 and 56 with a lead 272, and a zener diode 274 effectively connects the center points $c$ of the windings $A_1$, $A_2$, $B_1$ and $B_2$ with the lead 272. The center points $c$ between the coils $A_1$ and $A_2$ and the coils $B_1$ and $B_2$ is connected to the battery 172, as shown.

In operation, the rotor 26 would have a steady state position in its position illustrated in FIG. 1, with its index Y in alignment with the fixed radial marker $a_1 b_1$, when the stator coils $A_1$ and $B_1$ are energized. In this case, the stator poles 44 and 30 would both be south poles and would attract the north pole 48 of the rotor 26. Likewise, the other stator poles 32, 34, 36, 38, 40 and 42 would have the proper magnetic polarity to attract the rotor poles 50, 52 and 54 to hold them in their illustrated positions, midway between stator poles.

The rotor 26 moves in the direction X, and its next steady state position would be with the rotor pole 48 midway between the stator poles 30 and 32 and with the index Y in alignment with the radial marker $a_2 b_1$. In this case, the windings $A_2$ and $B_1$ would be energized; and both of the poles 30 and 32 would be south poles holding the north rotor pole 48 midway therebetween. The other stator poles 34, 36, 38, 40, 42 and 44 would have the proper magnetic polarities so as to hold the other rotor poles 50, 52 and 54 in corresponding positions.

The following steady state positions of the rotor 26 would be with its index Y being successively in line with the radial markers $a_2 b_2$, $a_1 b_2$, $a_1 b_1$, $a_2 b_1$, $a_2 b_2$, and $a_1 b_2$ as shown in FIG. I. These steady state positions would be caused by energizing, respectively, the stator coils corresponding to the designations of the radial markers; for example, the coils $A_1 B_2$ would be energized when the rotor index Y is in alignment with the marker designated as $a_1 b_2$.

The steady state positions of the rotor 26 have just been described for the purpose of illustrating the magnetic actions provided by the stator windings $A_1$, $A_2$, $B_1$ and $B_2$; however, preferably the motor 24 is used for providing a continuous movement of the rotor 26 and output shaft 46 from an original position of the rotor 26 to a final position of the rotor 26, first using the maximum acceleration (clockwise torque in the direction X) and then using maximum deceleration just prior to the final position of the rotor; and the circuitry shown in FIGS. II and III functions in this manner. More particularly, the circuitry in these figures causes the rotor 26 to move in the shortest possible time from its position illustrated in FIG. I for somewhat more than 180° as seen in this figure. to a final position in which the rotor pole 48 and the rotor index Y are in alignment with marker $a_2 b_1$.

Successive pulses on the lead 78 applied to the circuitry P of FIG. II are effective for successively shifting energization of the stator windings $A_1$, $A_2$, $B_1$ and $B_2$ in the manner above just described for successive steady state positions of the rotor 26 starting with its position illustrated in FIG. I. More particularly, in this example, a first or "go" pulse will cause the windings $A_2$ and $B_1$ to be energized, tending to move the rotor 26 so that its index Y is in alignment with the radial marker $a_2 b_1$; and the succeeding pulses on lead 78 will successively cause energization of the stator windings $A_2$ and $B_2$, the stator windings $A_1$ and $B_2$, the stator windings $A_1$ and $B_1$ and finally the stator windings $A_2$ and $B_1$. A total of nine pulses on the lead 78 are required for this operation, and these pulses are indicated on the curve entitled "78" (referring to the lead of this same number) in FIG. IV. The torque on the rotor 26 during the time of its movement is indicated on the uppermost, $\theta$ - torque curve of FIG. IV; and the abscissa indicates the movement of the rotor 26 in electrical degrees from its original position to its final position (the actual angular movement of the rotor 26 as illustrated in FIG. I is one-half of that indicated in this curve, since the numbers of rotor poles and stator poles are doubled from those of the most basic construction).

After the first of the pulses on the lead 78 (the initial "go" pulse), pulses 2, 3, 4 and 5 (see the curve "78" on FIG. IV) are initiated by the emitter 64 and thus occur at the predetermined rotational positions of the rotor of 45°, 135°, 225° and 315° (electrical degrees). Maximum acceleration occurs during this time (from 0° to 315° rotation of the rotor 26) with the rotor 26 moving at a steadily increasing speed in the X direction of rotation. When the rotor 26 is in its 315° position, pulses 6 and 7 are applied very quickly on the lead 78, and this has the effect of rotating the stator field 180 electrical degrees; and the stator thus is energized at this time to provide maximum deceleration. As the rotor travels from its 315° position to its final 450° position, the rotor is continuously decelerated as is indicated by the uppermost curve of FIG. IV; and at pulse 9, under the control of the emitter 64, the rotor 26 is held in its final position of 450°.

As will be observed from the $\theta$-torque curve of FIG. IV, the torque sub-curve A2B1 is used on the rotor 26 at the first or "go" pulse on lead 78, and this curve is applicable when the stator windings $A_2$ and $B_1$ are energized. At the 45° position of the rotor 26, the torque switches to the A2B2 torque sub-curve applicable when the $A_2$ and $B_2$ stator windings are energized. Subsequently, at the 135° position and 225° positions, the A1B2 and A1B1 torque curves are utilized. At pulses 5, 6 and 7, which occur substantially at the same time at the 315° position of the rotor 26, the torque changes from plus to minus so as to apply a decelerating action to the rotor 26; and, specifically at pulse 7, the torque sub-curve A1B2 is effective. At pulse 8, a change in decelerating action occurs, with the torque sub-curve A1B1 being effective. Finally, at pulse 9 on lead 78, the torque effective on the rotor 26 drops to zero, with the rotor 26 being held in its 450° position.

The time at which pulse 8 is applied to the lead 78 is adjusted so that the velocity of the rotor 26 is just reaching zero when the rotor reaches the desired rotated position of 450°. The timing of the application of pulse 9 incidentally is not very critical, since the rotor 26 is moving so slowly at this time that a change in timing does not result in a very large difference in angle of the rotor 26. Specifically, the motor control circuitry of FIGS. II and III times the application of the 8th pulse on lead 78 from the application of the 5th pulse on this lead, and the period between the applications of the 5th and 8th pulses is of such duration that the velocity of the rotor 26 is substantially zero when it reaches its 450° position, as mentioned.

With the 8th pulse being applied to the lead 78 a fixed time after the 5th pulse is applied thereto, substantially perfect stops of the rotor 26, with substantially no ringing or oscillation of the rotor, may be obtained, assuming that the load on the output shaft 46 remains constant and assuming that the voltage from the battery 172 does not change. If either one or both of these factors do however change, there may be some oscillation or ringing of the rotor 26 in its final 450° position, and the circuitry illustrated in FIGS. II AND III compensates for such changes in load and power supply voltage to obtain the same desirable results even with changes in loads and voltage.

Basically, the adjustments in the time between the applications of the 5th and 8th pulses to lead 78 (the quantity $t_{d8}$ illustrated in FIG. IV) is accomplished by the circuitry of the invention in the following manner: First, if the power supply voltage (from battery 172) is assumed constant, the time from zero time (at the time of the first pulse) to $t_5$ (when the 5th pulse is applied) is a measure of the load on the output shaft 46, and this is true because the torque on the rotor 26 from the energized stator windings is the same regardless of changes in load. If the load on the shaft 46 is greater, obviously a longer time to reach the time at which the 5th pulse is applied is required, and it should be borne in mind that the first 5 pulses are obtained from the emitter 64 and thereby with predetermined amounts of rotation of the rotor 26 and shaft 46. If the load is high as just mentioned, not as much retarding torque will be required to stop the rotor 26, and this is due to the fact that the increased load has a stopping effect on the rotor 26 and also the fact that the final speed of the rotor 26 is lower under these conditions. Thus the time $t_{d8}$ as shown in FIG. IV should be shorter if the rotor 26 is to have zero speed at time $t_9$, and this has the effect of reducing the net area under the sub-curves A1B2 and A1B1 in FIG. IV (on the lower portion of the uppermost figure of FIG. IV) producing the decelerating action on the rotor 26. In this connection, it may be mentioned that this area under these sub-curves (between the sub-curves and the zero torque axis) is proportional to decelerating energy applied to the rotor 26, and the same is true for the area under the sub-curves effective during accelerating action.

The following equation applies:

$$t_{d8} = K_1 + f(K_2 t_5) \qquad (1)$$

where $$\delta t_{d8}/\delta t_5 < 0$$

and in which $K_1$ and $K_2$ are constants and f indicates the function of the quantity in parentheses.

It will be understood that the above Equation 1 indicates that if the quantity $t_5$ is greater; in this case, the quantity $t_{d8}$ must become shorter. Therefore the partial derivative $$\delta t_{d8}/\delta t_5 < 0$$

Now, it may be assumed that the load on the shaft 46 remains constant, but the power supply voltage from the battery 172 rises. This voltage increase produces greater torque on the rotor 26, both accelerating and retarding; and the net effect is that the 8th pulse should occur at approximately the same position of the rotor 26. The higher accelerating torque, however, reduces the time at which the rotor 26 reaches its 5th position; and, from Equation 1, the quantity $t_{d8}$ would be increased. It is necessary, however, to reduce the quantity $t_{d8}$ because the average velocity from time $t_5$ to $t_8$ is greater. Another term must therefore be added to the above equation in order to accomplish this, so that this equation in revised form is as appears below: $t_{d8} = K_1 + f(K_2 t_5) + f(K_3 V_s)$ (2)

in which $V_s$ is the supply voltage from the battery 172 and whereby $$\delta t_{d8}/\delta V_s < 0.$$

The reduction in $t_{d8}$ indicated by Equation (2) is briefly necessary, because there is more energy from the battery 172 with a higher voltage therefrom applied onto the windings of the stator 28, so that the 5th position of the rotor 26 occurs sooner than otherwise and the 5th pulse is applied in a less time $t_5$. Therefore, Equation 1 must be modified as indicated by the second equation on account of an increase in voltage applied to the motor 24.

The term $$\delta t_{d8}/\delta V_s$$

in Equation 2 must be less than 0 inasmuch as this indicates that if $V_s$ is larger, $t_{d8}$ must be smaller. This is necessary, since if the quantity $V_s$ is greater, the quantity $t_5$ would have been less, so the system would tend to raise $t_{d8}$. However, this correction should not be made since the change in the quantity $t_5$ was caused by a change in power supply voltage rather than a change in load on the shaft 46, and the quantity $t_{d8}$ must be made smaller so as to account for the higher velocity from $t_5$ to $t_8$. It is desired that the switching of energization of the windings of the stator 28 be made at the same angle of the rotor 26 as without the increase in the voltage from battery 172, so the switching of winding energization must be at an earlier time with the increased voltage.

The analysis of the control circuitry and particularly of the circuitry Q to be hereinafter given will indicate that the In1 lead 142 has a signal on it from 0 to $t_5$ and has no signal on it at other times. The In2 line 144 is a reset line and is brought up with a signal thereon for a time after motion of the rotor 26 has been completed. A signal is present on the In3 line 146 from time 0 until time $t_5$, and the line is then immediately brought down in signal strength. The signal is returned under the control of the emitter 64 after the movement of the rotor 26 is completed.

An analysis of the circuit Q will show that, neglecting second order effects, the time delay from the time the signal on line 146 disappears until there is a change of signal strength on the line 140 is:

$$t_{d8} = t_d + 1/K_a t_5 + K_b V_s \qquad (3)$$

The latter equation fits the requirements of Equations 2 and 1 above given in that the partial derivatives of $t_{d8}$ with respect to $t_5$ and $V_s$ are negative and there are three variables $t_d$, $K_a$ and $K_b$ which can be adjusted to give the proper nominal value and the proper gains for any particular system.

FIG. V may be referred to as further illustration of the manner in which the time interval $t_{d8}$ is reduced under high loading of the output shaft 46. As is apparent from FIG. V, at normal load the velocity of the rotor 26 increases faster and to a higher final value (at $t_5$) than under a high friction load in which case the final rotor velocity is $t'_5$. Under high friction loading, as is shown in this figure, more time is required to turn the rotor 26 through its steps (at $t'_5$), and likewise the time required for the full motion of the rotor 26 is also longer. Since under high friction loading, a less retarding torque is required to stop the rotor 26 as above mentioned, the time $t'_{d8}$ is less than the time $t_{d8}$ as shown by FIG. V. Referring to FIG. IV, the time $t'_8$ with respect to the torque curves is illustrated in dotted lines; and it will be observed that the change from an energization of windings $A_1$ and $B_2$ to energization of the windings $A_1$ and $B_1$ occurs with less rotary motion of the rotor 26 subsequent to its 360° position than under normal loading.

The operation of the circuitry shown in FIGS. II and III for accomplishing these results will now be more specifically described, referring particularly to these figures. The rotor 26 is initially in its position as illustrated in FIG. I, and rotor rotation is initiated by providing a pulse on the line 100 (see the curve "100" in FIG. IV) by momentarily closing switch 74. The pulse on line 100 sets the latch 96 providing a signal on its output lead 98 which fires the single shot 94, producing a pulse into OR circuit 92 and on the output lead 82 of OR circuit 92 (see the curve "82" in FIG. IV). A similar pulse is thereby produced on line 78, and this causes triggers 250 and 252 to both change in state. At this time, due to the effects of the triggers 252 and 254, the transistors 258 and 262 are rendered conductive, and current thereby flows from battery 172 through the windings $A_2$ and $B_1$ so that both of the stator poles 30 and 32 have south magnetizations and the rotor 26 is pulled clockwise in the direction X toward the pole 30. The torque sub-curve A2B1 is then effective, and the torque effective on the rotor 26 has changed from 0 to the maximum as illustrated at 0° in the $\theta$ - torque curve of FIG. IV.

When the rotor 26 has rotated through 22 ½° (these are electrical degrees, and amount to 11 ¼ actual degrees of the motor 24 as illustrated with eight stator poles), so that its index Y is in alignment with the radial marker $e_2$, the emitter 68 produces a pulse (at time $t_2$) on the lead 72, more particularly, a crossing from minus to plus of the signal level in the lead 72 as is indicated by the curve "72" in FIG. IV. Incidentally, every time that the index Y of the rotor 26 aligns with one of the radial markers $e_2 \ldots e_8$, such an emitter pulse is produced by the emitter 64 on the lead 72.

The emitter amplifier 114 in response to the change in state of the signal level on lead 72 then produces a pulse on its output lead 112 (see the curve 112 in FIG. IV; likewise the other numbered curves in FIG. IV show the signal levels on the leads that are correspondingly numbered in FIGS. II and III), and this fires the single shot 110 producing a corresponding pulse on lead 108. Corresponding pulses are produced on leads 104, 82 and 78 as is indicated in FIG. IV, and the AND circuit 106 is enabled since the In1 line 142 has a signal on it at this time from the AND circuit 148. This pulse on lead 78 changes the state of the triggers 250 and 254 so that at this time the stator windings $A_2$ and $B_2$ are energized from the battery 172, the transistors 260 and 258 being conducting at this time.

Rotation of the rotor 26 then continues under its maximum acceleration until the index Y of the rotor 26 aligns with the radial marker $e_3$ which is aligned with stator pole 32. Pulses are produced in leads 108, 104, 82 and 78 in the same manner as previously described, and the pulse in lead 78 causes the triggers 250 and 252 to change in state so that the transistors 260 and 256 are conducting at this time to energize the windings $A_1$ and $B_2$. The rotor 26 is then rotated under maximum torque, as indicated by the sub-torque curve $A1B2$ in FIG. IV, from time $t_3$ existing at 135 electrical degrees of rotor rotation.

The 4th and 5th pulses are produced when the rotor 26 rotates farther so that its index Y aligns with the markers $e_4$ and $e_5$, respectively; and the sub-torque curve $A1B1$ is effective as shown in FIG. IV until the time $t_5$ which occurs when the rotor 26 has rotated sufficiently so that its index Y is in alignment with the radial marker $e_5$. As is apparent from the above description, the triggers 250, 252 and 254 provide a change in condition of the transistors 256, 258, 260 and 262 on successive pulses on lead 78 so that the following order of energization of the windings $A_1$, $A_2$, $B_1$ and $B_2$ has taken place until time $t_5$: $A_2 B_1$, $A_2 B_2$, $A_1 B_2$ and $A_1 B_1$. Likewise, additional pulses on the lead 78 cause the magnetic field defined by the stator 28 to be stepped one step in the clockwise direction as seen in FIG. I for each pulse; and therefore, additional pulses 6 and 7 cause the magnetic field defined by the stator 28 to be reversed as shown in FIG. IV. Likewise also, pulses 8 and 9 will cause the magnetic field of the stator 28 to be stepped one step clockwise, respectively, to the torque sub-curves $A1B1$ and $A2B1$ effective at times $t_8$ and $t_9$, respectively, as shown in FIG. IV.

The first five pulses just described appear on lead 82, the 1st pulse being due to the switch 74 and the following four pulses being due to the emitter 64. The lead 82 is connected with the Count 5 circuitry 102 and these pulses have the effect of changing the state of the Count 5 circuitry 102 so that it provides a signal after these five pulses on its output lead 118. This signal on lead 118 energizes the delay circuits 124 and 128. The delay of circuit 124 is very short, while the delay of circuit 128 is somewhat longer. After a short delay, the output of delay circuit 124 fires the single shot 122, and the output of single shot 122 on lead 84 produces the 6th pulse on lead 78 through OR circuit 80. The output of delay circuit 128 causes the single shot 126 to fire, and the 7th pulse is thereby produced on lead 78 through OR circuit 80. The 6th and 7th pulses occur very rapidly compared to the speed of rotor 26 and cause the effective torque to switch rapidly from curve $A1B1$ to curve $A1B2$ as has been previously described and as is shown in FIG. IV. The rotor 26 at this time is then being decelerated with a maximum deceleration.

The circuitry portion Q functions to provide the 8th pulse on lead 78, and this is done at a time such that the speed of the rotor 26 is substantially zero at the time of the 9th pulse which is under the control of the emitter 64. The circuit Q is furthermore effective to change the time $t_{d8}$ between the application of the 5th pulse and the 8th pulse in accordance with changes in load on the shaft 46 and changes in voltage from the battery 172 so that the speed of rotor 26 is about zero at time $t_9$ regardless of changes of load or voltage.

As is apparent from FIG. IV, the signal level on both the In1 lead 142 and the In3 lead 146 is up until the 5th pulse at which the signal levels on both leads go to 0. The signal level on the In3 lead 146 is controlled by the inverter 150, which in turn is controlled from the Count 5 circuitry 102, and thus the signal level on the In3 lead 146 is up until the Count 5 circuitry 102 has reached its full count of 5. The signal level on the In1 lead 142 is under the control of the AND circuit 148 which also is controlled by the inverter 150 and the Count 5 circuitry 102. In addition, the AND circuit 148 is under the control of the latch 96, and it will be apparent from FIG. IV that the output of the latch 96 is up from the 1st pulse on the lead 78 applied as an input to the circuitry P. Thus the signal level on the lead 142 goes up at time $t_1$ and reduces to 0 at the 5th pulse on the lead 78. The signal level on the In2 lead 144 is at 0, beginning with the 1st pulse on lead 78, as is apparent from FIG. IV.

The up signal on lead 142 starting at time $t_1$ turns the transistor 174 on and keeps it on so that current flows through the diode 180 and resistors 176 and 178, and the voltage appearing on lead 188 at the same time causes the transistor 184 to be turned on and to be maintained in current conducting condition so that capacitor 186 charges. The diode 180 under these circumstances functions as a constant voltage device and provides a constant current source with respect to capacitor 186. The rate of charge of capacitor 186 through transistor 184 is determined by this current source, which is thus constant; and, therefore, the charge on the capacitor 186 is linearly proportional to the time that the transistor 174 is conducting and the time that the signal is up on the In1 lead 142, until time $t_5$ which occurs at 315° of rotor movement. The voltage on capacitor 186 at the time $t_5$ is thus proportional to the length of time required for rotor 26 to move 315 electrical degrees or to the average speed of the rotor during this time, during accelerating phase.

At the time $t_5$, when the 5th pulse appears on lead 78, capacitor 212 begins to charge; and this effect is under the control of the signal level on the In3 lead 146. As before explained, the signal level on lead 146 remains up until time $t_5$; and, at this time, the signal level on the In3 lead 146 goes to zero and allows a constant voltage appearing across resistor 190 to provide a constant current through the resistor 210 and transistor 208 into capacitor 212 so that the capacitor 212 begins to charge. Resistor 190 has a constant voltage across it at this time since the In2 lead 144 has no signal on it; the transistor 196 is not conducting; and the transistor 192 is conducting. When the signal level on the In3 line 146 goes low at time $t_5$, transistors 202 and 218 cease conducting, and the transistor 204 begins conducting so that the transistor 208 also begins to conduct at this time. The rate of charging the capacitor 212 is determined by the length of time between the 1st and 5th pulses and more particularly by the voltage across the capacitor 186 which has been building up during this time (this voltage is effective to vary the charging rate of condenser 212 by being effective on transistor 208 by means of transistor 192).

The voltage on the lead 232 is constant, being determined by the voltage divider consisting of the resistors 226, 228 and 230 and the zener diode 234; and, when the voltage across the capacitor 212 and resistor 214 reach a level equal to the voltage on the lead 232, the discriminator applies a signal on lead 238. The time of application ($t_{d8}$) of the 8th pulse subsequent to the 5th pulse is thus proportional to the length of time ($t_5$) between the 1st and 5th pulses on the lead 78 which is a measure of the average velocity of the rotor 26 and the load on the shaft 46. The signal on the lead 238 energizes the delay circuit 236 which, after the predetermined delay provided by the circuit 236, provides a pulse on the lead 140 which fires single shot 138 producing the 8th pulse on lead 90, through OR circuit 80, and on lead 78. The 8th pulse thus has been provided at a time which varies in accordance with the load on shaft 46.

The purpose of the resistor 178 is to render the circuitry Q responsive to changes in voltage from the battery 172. The resistor 178 increases the voltage established on capacitor 186 as it charges with increases in the voltage from battery 172, since the voltage drop on resistor 178 increases with battery voltage and current; and the voltage drop across diode 180 and resistor 178 is impressed on transistor 184 which controls the charging of capacitor 186. This higher voltage on capacitor 186 causes the switching voltage at the discriminator 224 to be reached sooner so as to shorten time $t_{d8}$.

An analysis of the operation of the circuit Q will indicate that the questions above given are satisfied.

The 9th pulse on line 78 is provided under control of the emitter 64 but at a delayed time after the 5th emitter pulse on line 72. The output of the Count 5 circuitry 102 on lead 118 is applied to the AND circuit 116; and, therefore AND circuit 116 may provide an output on the lead 120 for the 5th emitter pulse (on line 72) which occurs when the rotor index Y aligns with the radial marker $e_6$ at 405° rotation of rotor 26. At 405°, the emitter 64 produces an output on its lead 72 that passes from negative, through 0, to positive; and another pulse appears at the output of the single shot 110 and produces a pulse at the output of the AND circuit 116 on lead 120. This has the effect of setting latching 136, and the output from the delay circuit 132 produces a pulse from the single shot 130 on lead 88 and thereby on lead 78 through the OR circuit 80. The delay 132 is adjusted so that the time to travel from 405° to 450° is about equal to the time between the emitter pulse on lead 72 and the logic pulse on lead 88. The 9th pulse on line 78 occurs at about the 450° position of rotor 26 due to the delay 132. This pulse on lead 78 has the effect of turning on stator windings $A_2$ and $B_1$ due to the action of triggers 250 and 252 and transistors 258 and 260, and rotor 26 is thus held in its final position by energization of stator windings $A_2$ and $B_1$, rotated at 450 electrical degrees from its initial position illustrated in FIG. I.

The signal on the lead 88 produced as the rotor index Y aligns with the radial line $e_6$ in FIG. I indicates that a stop condition exists, and the signal on lead 88 is applied on the latch 136, the latch 96 and the count circuit 102 for resetting these circuits into their original conditions. The resetting of the latch 96 has the effect of providing a signal on the single shot 152 by means of the inverter 156 so as to thereby provide the In2 singal on lead 144. The latter signal causes the transistor 196 to conduct and the charge on the capacitor 186 is thus dissipated as is shown in FIG. IV. The circuitry is then in condition for the application of another pulse by means of switch 74 for causing the rotor 26 to be rotated at maximum acceleration and deceleration for another step of 450 electrical degrees.

Various modifications may be made of the circuitry for securing substantially the same or similar results. Although the emitter markers $e_2$, $e_3$, etc., have been shown in alignment with the stator poles 30, 32, 34, etc., the timing of the emitter pulses may be varied by in effect rotating the emitter markers $e_2$, $e_3$, etc., so that they do not occur exactly at the centers of the stator poles. The rotation of the rotor 26 between initial and final positions may be changed simply by changing the Count 5 circuit 102 to one that provides an output signal on other numbers of counts. If, for example, a Count 25 circuit is substituted for the Count 5 circuit 102, the rotor 26 will rotate farther; and, in this case, the rotor may not accelerate for the full time before reaching the braking position but will rather approach a constant angular velocity. The time to reach the braking position will still be a measure of the system friction. The stepper motor 24 has been shown in FIG. I as having only 8 poles; it will be understood that the stepper motor 24 may, for example, have only four stator poles, or may have many more than eight stator poles. A particular stepper motor of the type illustrated had 200 stator poles; and, in this case, 360 electrical degrees (electrical degrees are shown on the abscissa in FIG. IV) is equal to 7.2° of actual rotation of the rotor 26. In lieu of the magnetic emitter 64; other emitters, such as optical encoders, may be used.

What is claimed is:

1. In combination, a stepper motor including a rotor and a stator, a plurality of windings on said stator, a source of electromotive force, an emitter rotatable with said rotor and producing output signals on incremental degrees of rotation of the rotor, switching means connecting said source of electromotive force with said windings and responsive to successive pulse signals applied to it for switching said windings in such a manner to provide a stepwise rotating field in said stator tending to rotate said rotor likewise, means connecting said emitter with said switching means so as to provide successive pulse signals to the switching means with rotation of said rotor to cause said rotor to accelerate from an initial position during an acceleration phase, and means responsive to one of the output signals of said emitter for applying to said switching means a pair of quick pulse signals in addition to this output signal from said emitter, said pair of quick pulse signals being spaced time-wise from this emitter output signal and from each other much closer than are said first named successive pulse signals derived from said emitter for thereby rotating the magnetic field in said stator through 180 electrical degrees and thereby providing a retrotorque braking action on said rotor to cause it to decelerate during a deceleration phase.

2. The combination as set forth in claim 1, said means for applying a pair of quick pulse signals including a pair of delay circuits of different inherent delay times energized by said last mentioned emitter output signal and each producing one of said quick pulse signals.

3. The combination as set forth in claim 1 and including a counter counting the output signals from said emitter and effective to provide the emitter output signal producing said pair of quick pulse signals after the counting capacity of said counter has been reached, said means for providing a pair of quick pulse signals including a pair of delay circuits of different inherent delay times energized by this emitter output signal and each producing one of said quick pulse signals.

4. The combination as set forth in claim 3 and including means controlled by said emitter for producing an additional pulse signal to said switching means between the time of application of said pair of quick pulse signals and the time at which said rotor reaches its final position so as to continue the decelerating action of said stator on said rotor.

5. The combination as set forth in claim 1 and including deceleration control means for providing one or more pulse signals to said switching means subsequent to the application of said pair of quick pulse signals to said switching means so as to continue the retrotorque braking action on said rotor during deceleration phase before the rotor reaches its final position,
measuring means for measuring the time required for said rotor to pass through a predetermined angle between its initial position and its position at which said pair of quick pulse signals are applied to said switching means, and
over-control means controlled by said measuring means for changing the time of application of one of said pulse signals applied to said switching means subsequent to said pair of quick pulse signals with respect to the time at which said pair of quick pulse signals are applied to said switching means in accordance with different times required for said rotor to pass through said predetermined angle during said acceleration phase and thereby changing the amount of decelerating force on said rotor in said deceleration phase.

6. In combination, a stepper motor including a rotor and a stator, a plurality of windings on said stator, a source of electromotive force, an emitter connected with said rotor and producing output signals on incremental degrees of rotation of the rotor,
switching means connecting said source of electromotive force with said windings and responsive to successive pulse signals applied to it for switching said windings in such a manner to provide a stepwise rotating field in said stator tending to rotate said rotor likewise,
means connecting said emitter with said switching means so as to provide successive pulse signals to the switching means with rotation of said rotor to cause said rotor to accelerate from an initial position during an acceleration phase, and
means for applying to said switching means a triad of pulse signals which are spaced together timewise much closer than are said first named successive pulse signals derived from said emitter for thereby rotating the magnetic field in said stator through 180 electrical degrees and thereby providing a retrotorque braking action on said rotor to cause it to decelerate during a deceleration phase.

7. In combination, a stepper motor including a rotor element and a stator element, a plurality of windings on one of said elements,
an emitter driven by said rotor element and producing output signals for predetermined degrees of rotation of said rotor element,
acceleration control means under the control of said emitter output signals so as to successively energize said windings in a certain pattern in accordance with degrees of rotation of said rotor element to cause said rotor element to accelerate from an initial position to a torque switching position and toward a final position in an acceleration phase,
deceleration control means for successively energizing said windings in another pattern in lieu of said first-named pattern of winding energization beginning at said torque switching position of said rotor element as the rotor element moves toward its final position and including the energization of a second winding subsequent to the energization of a first winding so as to put a decelerating force on the rotor element during a deceleration phase before the rotor element reaches its final position,
measuring means for measuring the time required for said rotor element to pass through a predetermined angle between its initial position and said torque switching position during said acceleration phase, and
over-control means controlled by said measuring means for changing the time of energization of said second winding with respect to the time of energization of said first winding in said deceleration phase in accordance with different times required for said rotor element to pass through said predetermined angle during said acceleration phase for accordingly changing the amount of decelerating force on said rotor element.

8. The combination as set forth in claim 7, said deceleration control means being arranged to energize said first winding in said deceleration phase at said torque switching position of said rotor element, and said over-control means being arranged to change the time of energization of said second winding in said deceleration phase at different times subsequent to the time at which said rotor element passes through its torque switching position.

9. The combination as set forth in claim 8, said over-control means being so arranged as to hasten the time of energization of said second winding in said deceleration phase with increases in the time required for said rotor element to pass through said predetermined angle during said acceleration phase.

10. The combination as set forth in claim 8 and including a source of electromotive force for energizing said windings, said over-control means also being under the control of changes in voltage of said electromotive force source for changing the time of energization of said second winding in said deceleration phase with changes in voltage of said source of electromotive force.

11. The combination as set forth in claim 10, said over-control means being arranged so as to hasten the energization of said second winding in said deceleration phase with rises in voltage of said source of electromotive force.

12. The combination as set forth in claim 7, said windings being disposed on said stator element, and said acceleration control means for successively energizing said windings providing a rotating field in said stator element for causing said rotor element to accelerate from its initial position.

13. The combination as set forth in claim 7, said measuring means for measuring the time required for said rotor element to pass through a predetermined angle including a condenser which charges as said rotor element accelerates in its acceleration phase, and said over-control means controlled by said measuring means including means responsive to the charge accumulated on said condenser.

* * * * *